Sept. 6, 1966

R. S. WILKES ETAL
SCREW-CONVEYOR FEEDER 3,270,857

Filed Feb. 24, 1964

INVENTORS
R. S. WILKES, A. E. KLOUDA,
E. A. HENNINGSEN & A. B. SKROMME
BY
*William A. Murray*
ATTORNEY Sept. 6, 1966　　　R. S. WILKES ETAL　　　3,270,857
SCREW-CONVEYOR FEEDER
Filed Feb. 24, 1964　　　　　　　　　　　　8 Sheets-Sheet 2
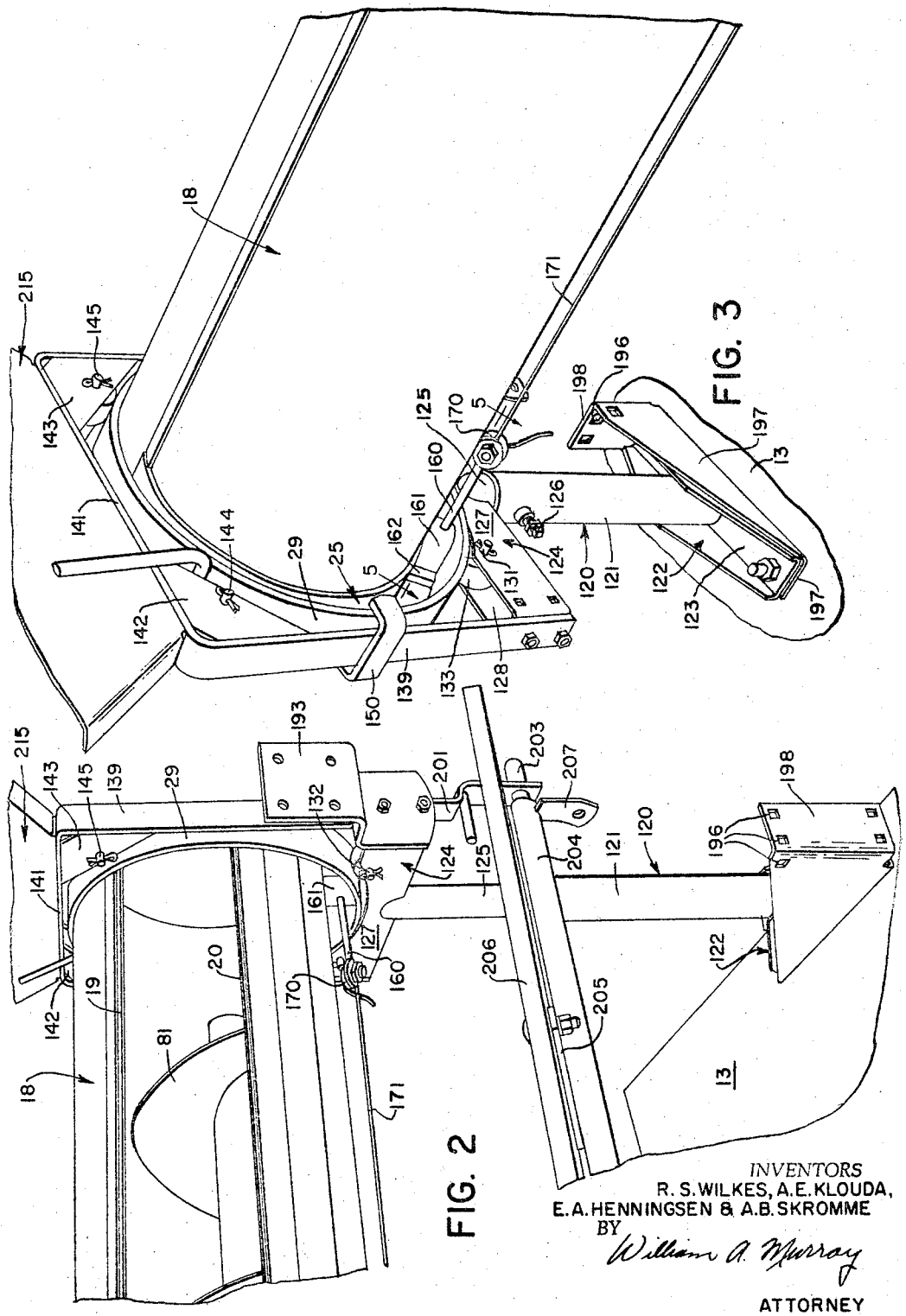
INVENTORS
R. S. WILKES, A. E. KLOUDA,
E. A. HENNINGSEN & A. B. SKROMME
BY
William A. Murray
ATTORNEY

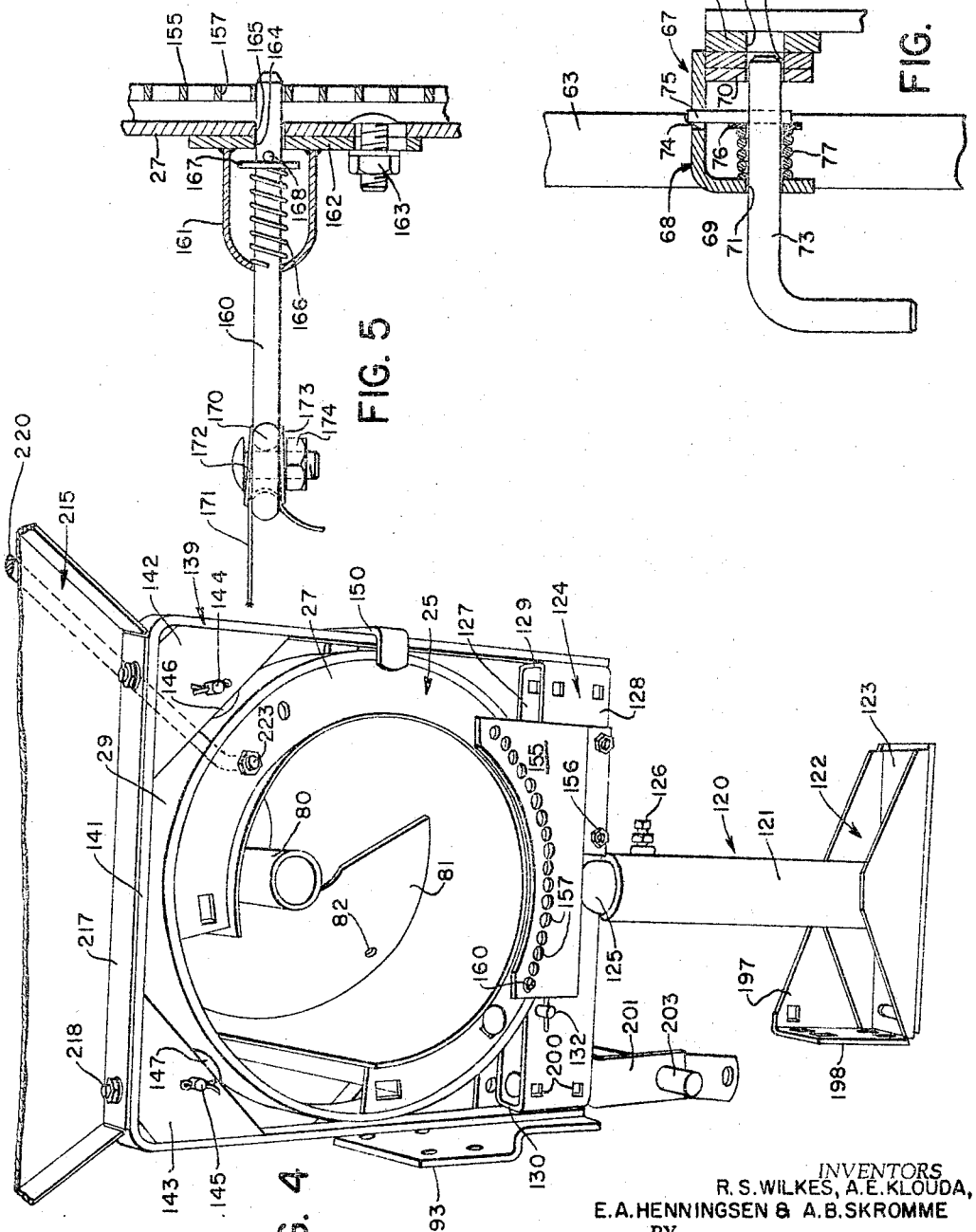

INVENTORS
R. S. WILKES, A. E. KLOUDA,
E. A. HENNINGSEN & A. B. SKROMME
BY William A. Murray
ATTORNEY Sept. 6, 1966   R. S. WILKES ETAL   3,270,857
SCREW-CONVEYOR FEEDER Filed Feb. 24, 1964   8 Sheets-Sheet 7

INVENTORS
R.S.WILKES, A.E.KLOUDA,
E.A.HENNINGSEN & A.B.SKROMME
BY
William A. Murray
ATTORNEY Sept. 6, 1966  R. S. WILKES ETAL  3,270,857
SCREW-CONVEYOR FEEDER
Filed Feb. 24, 1964  8 Sheets-Sheet 8
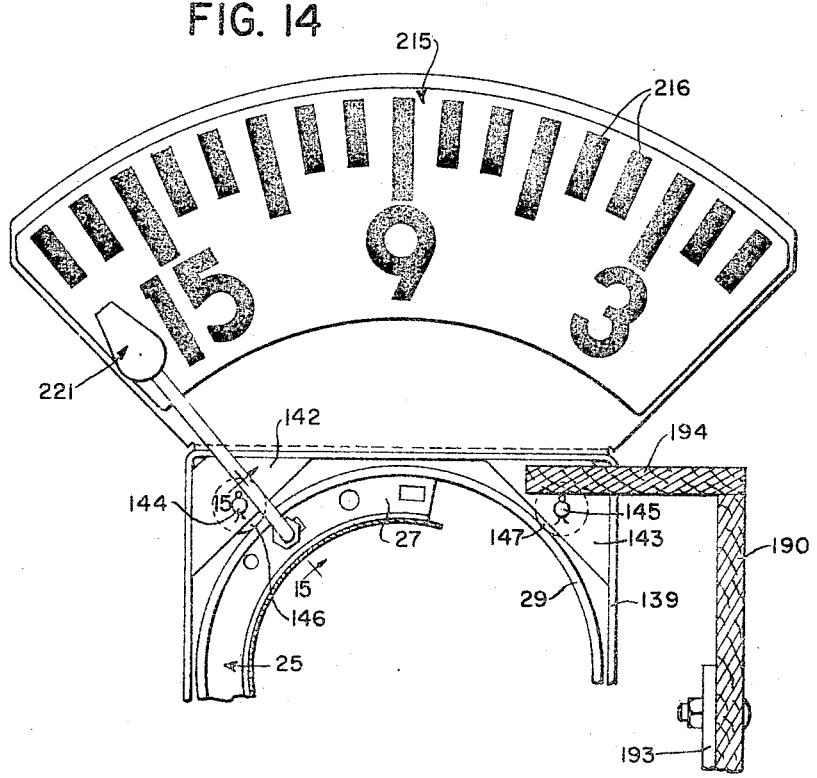
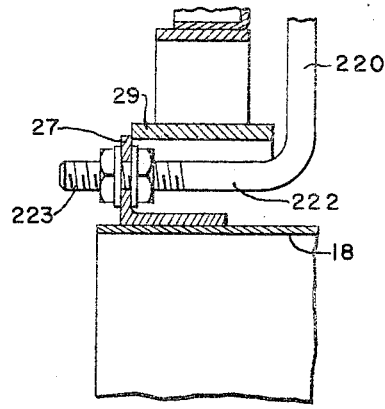
INVENTORS
R.S.WILKES, A.E.KLOUDA,
E.A.HENNINGSEN & A.B.SKROMME
BY William A. Murray
ATTORNEY

3,270,857
SCREW-CONVEYOR FEEDER
Raymond S. Wilkes and Alvin E. Klouda, Moline, and Etlar A. Henningsen, Geneseo, and Arnold B. Skromme, Moline, Ill., assignors to Deere & Company, Moline, Ill., a corporation of Delaware
Filed Feb. 24, 1964, Ser. No. 346,822
21 Claims. (Cl. 198—64)

This invention relates to a material conveyor and more particularly to a material conveyor utilizing an elongated auger having an auger housing with a continuous slot extending from one end to the opposite end and connected at an intake end to a material hopper that feeds material directly into the conveyor.

In the use of material conveyors of the type to be described or the type referred to in the trade as bunk feeders, it is necessary to provide a readily adaptable unit capable of moving various types of material such as silage, grain, and hay that has various characteristics. It is the primary object of the present invention, therefore, to provide an auger type conveyor adaptable and adjustable to move material of different and varying characteristics and which may be adjusted throughout its length from a position located adjacent one end of the conveyor.

It is specifically the purpose of the present invention to provide an auger type housing composed of a series of housing sections disposed end-to-end with each section being C-shaped in cross-section and having a side opening slot. It is an object of the invention to provide a unique type of interconnection between adjoining ends of the housing that will maintain the slots of adjacent housings aligned and in a continuous manner so that throughout the entire housing the slot is continuous from one end to the opposite end. The junctures or connections between the ends will afford rigidity throughout the length of the housing structures. The junctures include a portion bridging the slot at a considerable distance away from the edges of the housing structure forming the slots so that haylage and silage, or other type of material of relatively long fibrous content, may not contact and hairpin about the bridging member. Specifically it is proposed to provide a cylindrical shaped ring spacedly outwardly from the housing surface that will serve not only to reinforce the housing sections at their ends but will further provide a means or surface on which the entire structure may be rotatably carried. Basically the entire housing structure is supported on longitudinally spaced upright supports having roller means for contacting the undersides of the cylindrical rings at these junctures.

It is still a further object of the present invention to provide with the aforementioned type of housing structure adjusting devices at opposite ends thereof permitting adjustment of the ends angularly about the axis of the auger independently of one another. With the adjusting means there are provided latching or locking elements that will unlock or lock the ends at any angular position. Control means for the adjusting and latching means at both ends of the auger housing are proovided adjacent one end of the housing. Therefore, an operator positioned adjacent one end, which is preferably the intake end of the auger housing, may adjust both the remote end of the housing structure as well as the intake end. The operator may adjust the inclination of the side opening slot in the auger housing. This feature is important since it is recognized that the characteristic of the material moving through the housing will affect the rate of discharge. For example, long fibrous material will not be discharged at the same rate as granular material. Consequently, the angular inclination of the side opening slot must be adjusted for different types of materials used.

It is a further object of the invention to provide with the above described type of adjusting arrangement a means at the remote end of the auger housing that includes a faced member and an indicator element movable with the end of the auger housing to indicate on the faced member the angular setting of that end of the housing.

In many types of auger feeders, and particularly in the type of auger feeder used to move haylage or silage, the material is often introduced into the hopper feeding the material into the auger housing in clumps of such magnitude and size that it will clog the auger. In some instances the clumps create such a large load on the auger to burn out the electric motor driving the auger or in some instances even to create breakage in some part of the auger or hopper structure. It is therefore a further object of the present invention to provide a unique type of stripper and protecting elements within the hopper and above the auger portion extending into the hopper that prevents large clumps of material from entering into the area of the auger.

As a further object of the present invention it is proposed to mount on the helicoid flighting of the auger and within the auger housing a plurality of agitating means tending to agitate the grains or small granular materials moving through the auger and to move them over the lower edge of the side slot. Such agitating means spaced longitudinally along the helicoid flighting aids in even distribution of granular materials throughout the length of the auger housing.

As a further object of the present invention it is proposed to provide panel structure adjacent to and below the side discharge of the auger housing preventing grain being blown from the area of discharge onto the ground surrounding the material conveyor. It should be understood that when using small granular material, and even sometimes when using relatively heavier materials such as silage, the wind around a conveyor, and particularly in an open field, is of such magnitude that it will literally blow the material away from the bunk in which it is being discharged. Therefore, it is the further purpose of the present invention to provide longitudinally extending panel means including an upright panel offset from the side discharge slot of the auger housing that has a lower horizontal edge. Cooperating with the upper panel is a lower panel extending upwardly from the floor of the bunk or trough that has an upper edge spaced below the lower edge of the upper panel. Provided intermediate of the upper and lower panels is structure defining a longitudinally extending horizontal pivot and structure for mounting an intermediate panel thereon. The intermediate panel will bridge the gap between the lower and upper edges of the upper and lower panels respectively. Adjustment means are provided to vary the degree of inclination and the direction of inclination so that material may flow from the side discharge slot of the auger housing to either side of the lower panel. By providing the pivotally mounted intermediate or middle panel, the inclination may be varied so that the material flows on the leeward side thereof and lands on the leeward side of the lower upright panel thereby at no time being subject to the draft of the cross-wind beneath the auger and trough floor.

Other objects and advantages of the present invention will become apparent to those skilled in the art as the nature of the invention is better understood from the following description and as shown in the accompanying drawings.

FIG. 2 is a side perspective view of the remote end of the auger conveyor with some of the panels removed to more clearly show the structure at that end.

FIG. 3 is a view somewhat similar to FIG. 2 but taken from the opposite side thereof.

FIG. 4 is an end perspective view of the remote end of the conveyor showing the support at that end.

FIG. 5 is an enlarged sectional view taken substantially along the line 5—5 of FIG. 3.

FIG. 13 is an enlarged sectional view taken substantially along the line 13—13 of FIG. 9.

FIG. 14 is a vertical sectional view taken along the line 14—14 of FIG. 1.

FIG. 15 is an enlarged sectional view taken substantially along the line 15—15 of FIG. 14.

FIG. 16 is an enlarged sectional view taken substantially along the line 16—16 of FIG. 7.

Figure 1:
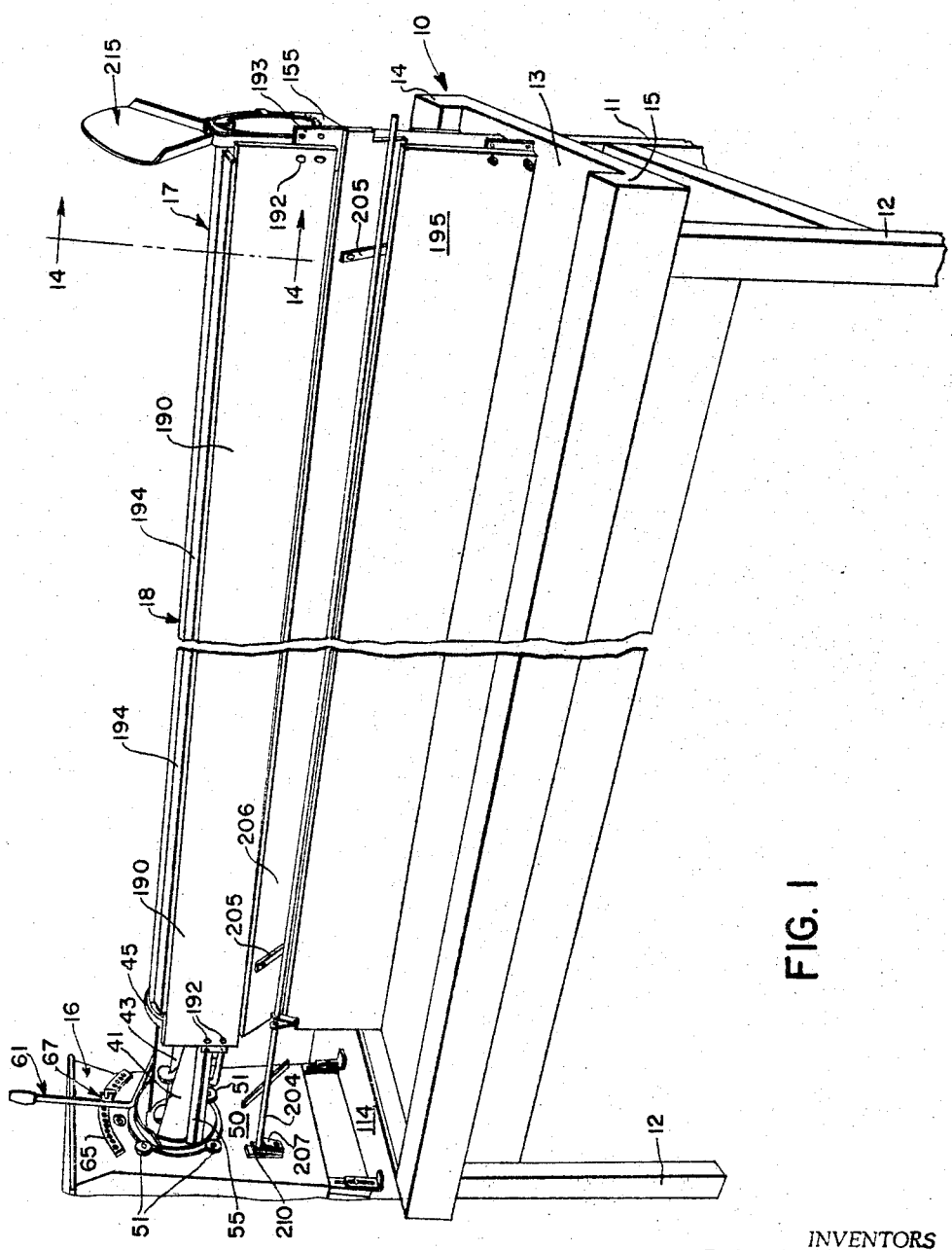
FIG. 1 is a side perspective view of the material conveyor with portions broken away and showing a part of the hopper at one end of the conveyor.
Figure 6:
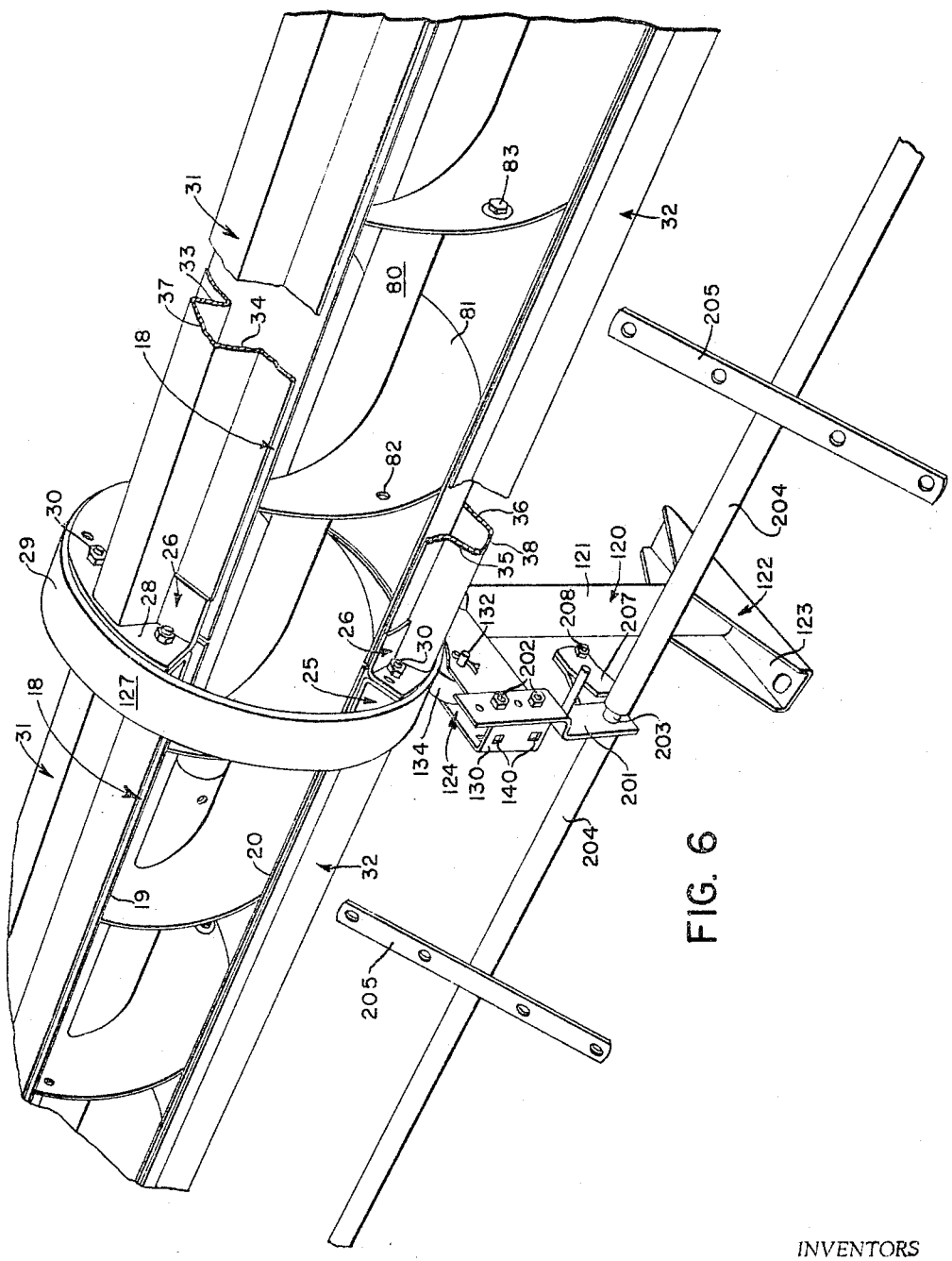
FIG. 6 is a perspective view of a center portion of the conveyor structure with parts removed for purposes of showing structure hidden behind those parts.
Figure 7:
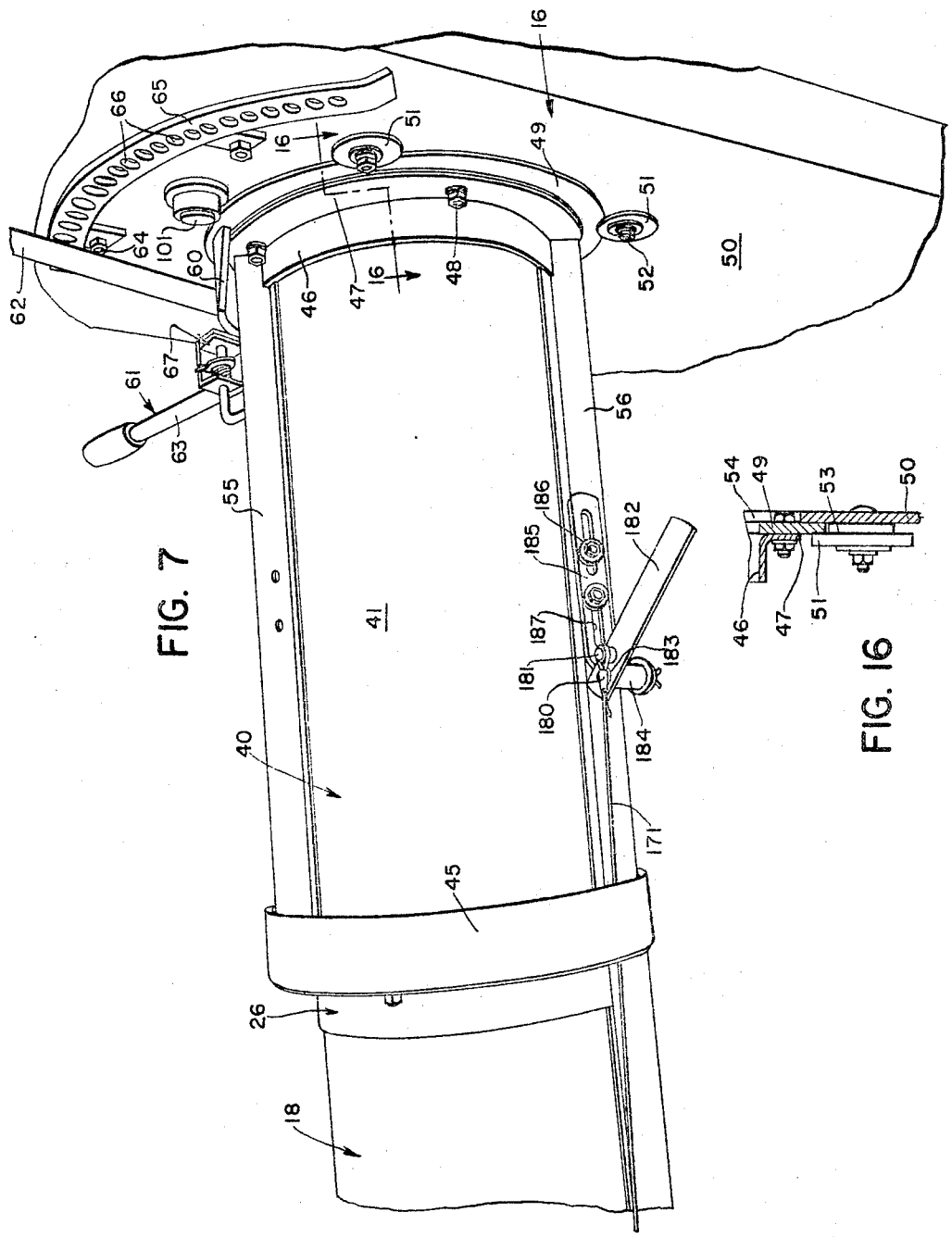
FIG. 7 is a side perspective view of one end of the hopper structure and the intake end of the conveyor.
Figure 8:
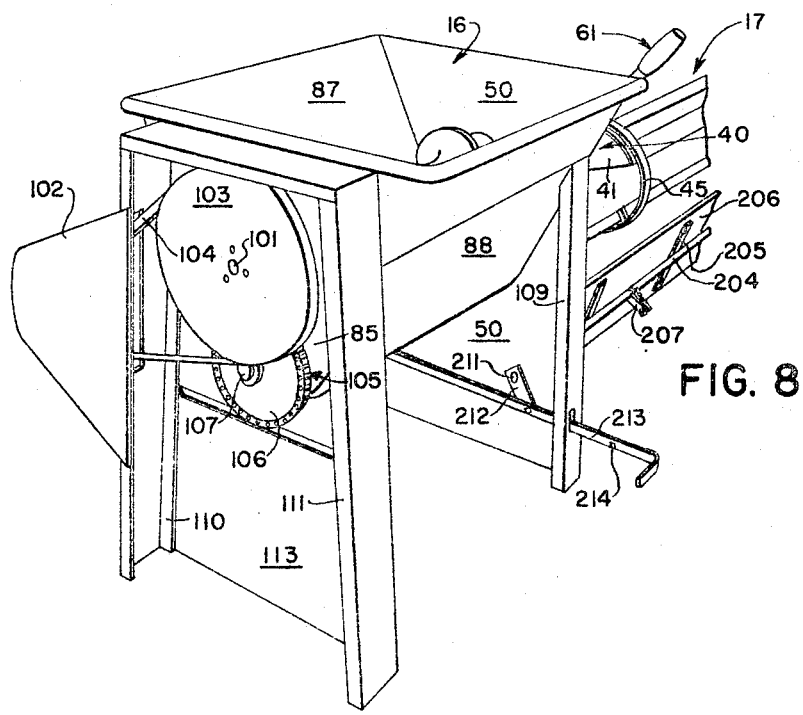
FIG. 8 is an end and side perspective view of the hopper and the intake end portion of the conveyor.
Figure 9:
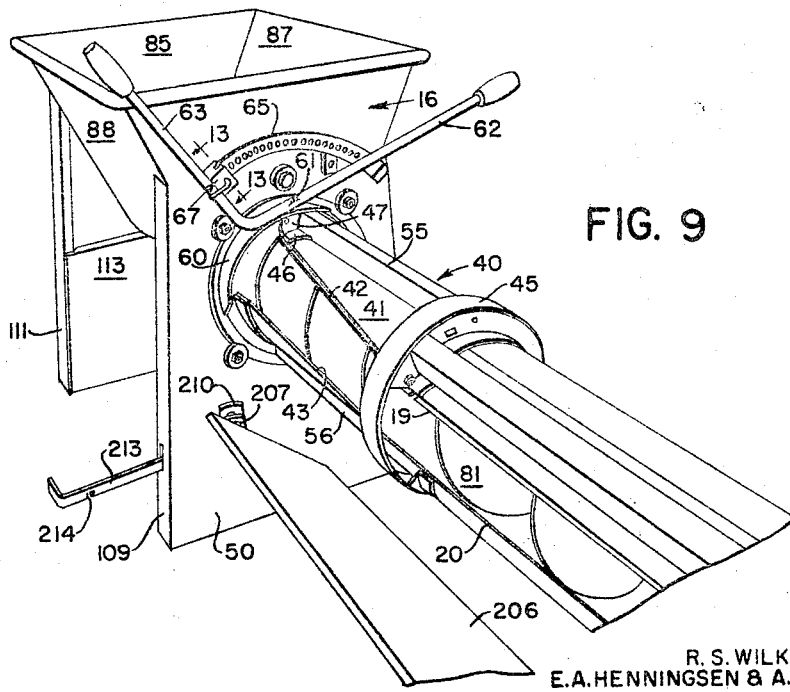
FIG. 9 is a perspective view of the hopper and conveyor similar to FIG. 8 and taken from the opposite end of the hopper.
Figure 10:
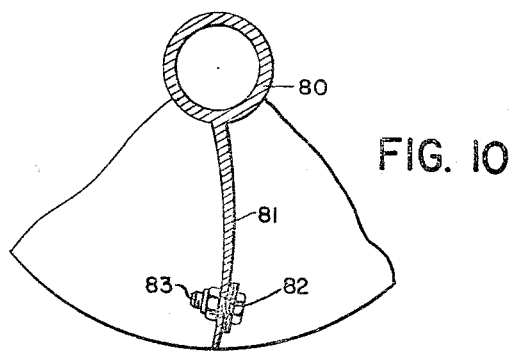
FIG. 10 is a sectional view through the helicoid flighting of the conveyor.

The material conveyor is normally supported to discharge material onto an elongated bunk 10 having support legs 11, 12 spaced longitudinally along the bunk or trough. The bunk proper is composed of a floor 13 and oppositely disposed upright sides 14, 15 extending upwardly from opposite edges of the floor 13. It is desirable to feed the material onto the floor and between the side walls 14, 15. This is, of course, conventional in most types of bunks or troughs and consequently details are not given of the construction since any of a number of conventional types would be satisfactory.

Supported at one end of the bunk 10 and usually within a barn, crib or other type of grain bin or silage storage is a hopper 16 positioned to receive the material to be discharged from the grain bin or silo by a suitable conveying means, not shown. Extending outwardly and above the bunk floor 13 is a horizontal conveyor indicated in its entirety by the reference numeral 17. The conveyor 17 includes an auger housing composed of auger housing sections 18 generally identical in construction and disposed in end-to-end relation. Each section 18 is C-shaped in cross-section having a continuous slot, as indicated by the slot edges 19, 20 extending the entire length of the section. At the juncture or adjoining ends of the sections 18 there is provided a pair of angle iron structures 25, 26 extending around the respective housing sections 18 and also being C-shaped with an open side thereof in registry with the slot in the side of the housing sections 18. The angle iron structures include vertical flanges 27, 28 extending outwardly and having an outer circular shaped edge. Fixed to the outer edges of the vertical flanges 27 are cylindrical shaped annular tracks 29, concentric with the axis of the auger housing. The tracks 29 extend completely around the housing structure and are radially spaced from the surfaces of the sections 18. The rings 29 bridge the gap between the upper and lower edges 19, 20 and also the gap on the open side of the flanges 27, 28. The outer surface of the ring 29 serves as an annular path or track for vertical support means, later to be explained. The flanges 27, 28, are bolted, as at 30, and consequently the adjoining ends of the respective sections 18 are rigidly fixed together. Extending longitudinally of the sections 18, above and below the respective edges 19, 20 are reinforcing beam structures 31, 32 extending substantially the entire length of the respective sections 18 and connected at their opposite ends, by welding or other suitable means, to the flanges 27, 28. The beams 31, 32 are U-shaped in cross-section with the leg portions 33, 34 and 35, 36 fixed to the outer surface of the sections 18. The legs 33, 34 are interconnected by a bight portion 37, and the legs 35, 36 are interconnected by a bight portion 38. With the reinforcing structure 31, 32 fixed to the surface of the auger housing sections 18, the entire length of the conveyor housing becomes uniformly rigid.

Adjacent the hopper 16 there is a short auger intake section 40 including an auger housing 41 having a side opening means in the form of a slot defined by upper and lower edges 42, 43 respectively. The outer end of the section 40 is provided with a flange, not shown, and an annular ring 45, both of which are quite similar to the flanges 27 and ring 29 previously described relative to the housing sections 18. Both edges 42, 43 of the slot continue from the slot in the sections 18 but are sloped at a steeper angle, the purpose being to prevent silage and other material that might leave the hopper 16 in clumps from being discharged over the lower edge 43 until the auger has an opportunity to spread the material along its trough. The inner end of the section 40 is provided with an angle iron C-shaped support 46 having a radially outwardly extending flange 47. The C-shaped support 46 has a horizontally disposed flange fixed to the surface of the housing 41. Bolted to the radial flange 47, as at 48, is a large annular plate 49 extending completely around the housing 41 to thereby bridge the slot between the edges 42, 43, and the open side of the C-shaped support 46. The ring 49 as well as the auger sections 40, 18 are rotatably carried on the end wall 50 of the hopper 16 by means of a plurailty of angularly spaced disks 51 bolted, as at 52, to the wall 50. The disks 51 are spaced 90° apart about the axis of the ring 49. Each disk 51 has a hub section 53 offset inwardly from the outer edge of the disks 51 so as to receive the peripheral edge of the ring 49. The wall 50 has an opening 54 in registry with the auger housing 41. The section 40 also has a pair of reinforcing channels 55, 56 above and below the slot edges 42, 43.

Fixed to the vertical flange 47 and extending axially relative to the auger structure is an arcuate shaped sector member 60 having an L-shaped lever 61 welded to its outer surface. Lever arms 62, 63 of the L-shaped lever extend from the sector 60 and have manual gripping means on respective ends thereof. Positioned above the opening 54 and mounted on the wall 50 by means of bolts 64 is an arcuate shaped sector member 65 having a series of arcuate spaced holes 66 therein. A latch device 67 is fixed to the arm 63 of the lever 61. The device 67 is composed of a U-shaped channel structure 68 having vertically disposed oppositely disposed flanges 69, 70 with aligned holes 71, 72 therein for receiving one leg of an L-shaped latching element 73. The channel 68 has an outwardly opening slot 74 receiving a pin 75 passing through the center of the latching element 73. A washer 76 and spring 77 are supported on the latching element 73 between the pin 75 and the end structure 69. The end flange or structure 70 will normally operate to lie adjacent to the arcuate member 65 and the holes 71, 72 will normally be aligned with one of the holes 66 in the arcuate member 65. When the pin 75 is moved into the slot 74, the latching element 73 is in its retracted position out of the respective hole 66 and the lever 61 may then operate to shift the entire auger housing structure angularly about the auger structure. This may be done for purposes of locating or relocating the slot at the intake end of the auger structure. Upon reaching the desired location, the latch element may be inserted in the proper hole 66 and that end of the auger structure is in a fixed angular position.

Contained in the housings 18 and 41 is a continuous auger structure composed of a central core 80 and helicoid flighting 81 extending from and supported on the core 80. The helicoid flighting as well as the core 80 may be built in sections of comparatively short length and fixed together for rotation in unison. The exact construction of the helicoid flighting 81 as well as the core 80 is not of particular importance in the present invention. However, the helicoid flighting 81 is provided with a sereis of openings 82 for receiving agitating members, in the particular form here shown as bolts 83 that will tend to give something other than a completely smooth surface to the helicoid flighting and will in effect create some agitation in the material being moved by the flighting 81. This is of particular significance in moving relatively small grain by the auger since it is often necessary to create some agitating action in the grain in the base of the auger housing to move it over the lower edges of the slot. The agitating bolt members 83 may, of course, be removed when desired and often it will be desired to remove them when moving long fibrous materials such as haylage or silage. Therefore, it is of particular significance that the agitating members be removable. The auger flighting 81 and its core 80 extend the complete length of the auger housings 18 and 41. The auger 81 has an end portion 84 extending beyond the end of the housing 41 and into the base of the hopper 16.

Figure 11:
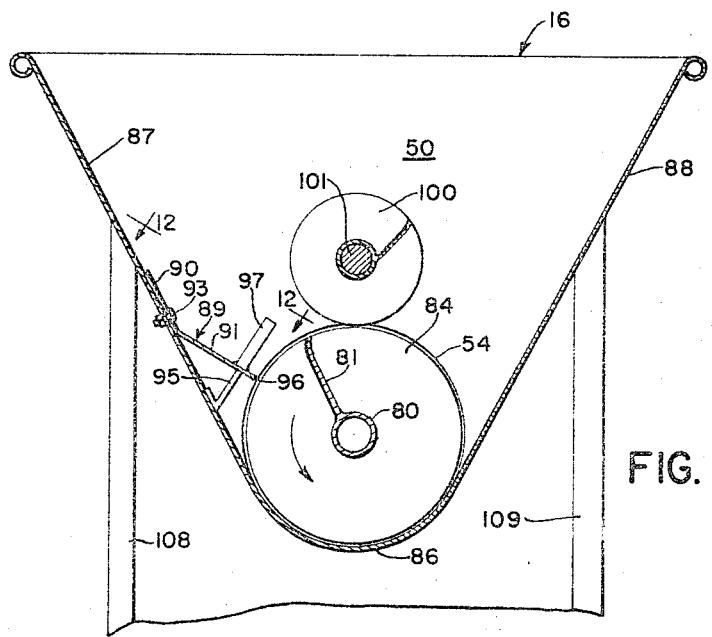
FIG. 11 is a vertical transverse sectional view through the hopper structure.
Figure 12:
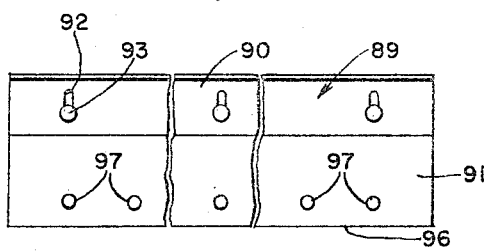
FIG. 12 is a plan view taken substantially along the line 12—12 of FIG. 11.

The hopper 16 is composed, besides the end wall 50, of an opposite end wall 85 and an arcuate shaped floor portion 86 underlying the auger portion 84 and generally struck about an axis of the auger core 80. The hopper 16 also has a pair of diverging side walls 87, 88 extending generally tangential, in respect to the auger flighting 81 upwardly and outwardly from the floor portion 86. The auger flighting 81 moves in a downward direction, as shown by the arrow in FIG. 11, adjacent the wall 87 and upwardly adajacent the wall 88. Provided on the wall 87 is a stripper plate 89 having a portion 90 lying adjacent the side wall 87 and a downwardly and inwardly inclined portion 91 disposed substantially normal to the edge of the auger flighting 84 or approximately on a radial plane extending from the axis of the core 80. The flange 90 is provided with elongated slots 92 receiving bolts 93 connecting the portion 90 to the side wall 87. The stripper plate 89 may therefore be adjusted toward or away from the edges of the auger flighting 84 as desired. Reinforcing starps 95 project from the underside of the stripper plate 91 and lie on the surface of the side wall 87. The edge 96 of the stripper plate 89 will always lie adjacent the edge of the auger flighting 84 and will generally prevent material from moving in clumps into the auger flighting. For further purpose of preventing large clumps from moving into contact with the auger flighting 81, there is provided a series of longitudinally spaced finger elements 97 projecting upwardly from the face of the stripper plate portion 91. The purpose of the elements 97 is to prevent clumps of material from being caught on the edges of the auger flighting 81 and moved axially along the flighting until it contacts the edges of opening 54. The latter would create a clogging condition in the unit. Also the auger flighting 81 would operate as a cutting element with the edges 54. The latter condition is not desired for the reason that if the auger flighting operates as a cutting element, the power required for operating the entire auger structure increases considerably and in many instances above the low output of the small electric motor operating the auger.

An agitating auger 100 is provided above the auger portion 84 and is supported on a central shaft 101 extending through and journaled on the respective end walls 50, 85 of the hopper. Power for operating the agitating auger 100 is by means of an electric motor, not shown, but indicated in its location by a belt drive housing 102, and a belt drive including a pulley 103 fixed to the shaft 101 and a V-belt 104 extending from a pulley on the electric motor to the pulley 103. A chain drive shown only partially at 105 includes a chain sprocket, not shown, on the shaft 101 and a sprocket 106 on a shaft 107 fixed to the core 80. The chain drive 105 operates or drives the entire auger or helicoid flighting 81. The hopper 16 is supported on upright supporting legs 108, 109, 110 and 111 adjacent the respective end walls 50, 85 and interconnected by upright panels 50, 113, the latter also serving in part as the end walls of the hopper. The legs 108–111 are supported, in the particular instance presently shown in FIG. 1, on a platform 114 at one end of the bunk or trough 10.

The conveyor 17 is supported on the trough floor 13, which is the basic support for the conveyor, by means of longitudinally spaced upright support assemblies 120. Each support assembly includes a supporting post 121 projecting upwardly and rigidly fixed to an upwardly opening base channel 122 having a horizontal flange 123 that may be bolted to the floor 13 of the bunk. The post 121 is a hollow pipe and carries at its upper end a cradle member 124 with a downwardly extending rod 125 that telescopes into the post 121. A set screw 126 is provided on the post 121 so as to adjust or set the height of the member 124. The cradle member 124 is composed of longitudinally spaced upright metal straps or walls 127, 128 having interconnecting integral ends 129, 130. Pivot pins 131, 132 extend between the channel walls 127, 128 and carry rollers 133, 134 that extend upwardly beyond the upper edges of the walls 127, 128 and engage the circular outer side of the rings 45 and 29. It is normally desired to provide an upright support assembly 120 at each juncture of adjacent ends of the housings 18 and the adjacent ends of the housing 41 and 18. The upper edges of the walls 127, 128 are cut to an arcuate shape to provide clearance between the underside of the rings 29, 45 and the respective upper edges of the cradle members 124. As may be clearly seen from viewing various of the figures, the entire rings 29, 45 may be completely rotated on the rollers 133, 134 and the slot between the edges 19, 20 and 42, 43 may be located in any angular position relative to the axis of the auger.

The outer or remote end of the conveyor is supported basically on an upright support 120. However, additional support is provided at this end so as to prevent vertical movement of the end. The attachment for providing such support includes an inverted U-shaped metal strap 139 having opposite leg portions bolted at their lower ends to the ends 129, 130. The respective ends 129, 130 are provided with openings 140 so that various attachments may be attached on those ends. The U-shaped strap 139 includes an overhead horizontally disposed portion 141 that lies above the respective cylindrical ring 29 at that end. Diagonal braces 142, 143 extend from the leg portions of the U-shaped bracket 139 to the horizontal portion 141 and are rigidly connected to the opposite edges of the respective strap 139. Consequently there is spacing between the respective diagonal braces. The braces carry horizontal pivot pins 144, 145 having rollers 146, 147 respectively journaled thereon with a lower inner portion of the rollers engaging the upper sides of the ring 29. A U-shaped member 150 with inwardly extending leg portions is supported on one of the legs of the strap 139 and has its respective leg portions engaging opposite edges of the ring 29 so as to prevent axial movement of that portion of the auger housing relative to the support 120.

A latching device is provided at the remote or outer end of the conveyor 17 for purposes of preventing angular movement of the housing at that end. The latching device includes in part a plate 155 bolted at 156 to the wall or strap portion 128. The plate 155 has an upper arcuate row of latch receiving openings 157. The bracket 155 lies adjacent the C-shaped flange 27 and the row of openings 157 are opposite the face of the flange. The latch device further includes a latch element 160 extending through a U-shaped bracket 161 having its opposite legs welded to the face of a flat metal strap 162 bolted at 163 to an opposite face of the C-shaped flange 27. The strap 162 has an opening 164 and the flange 27 has an opening 165 through which the latch element 160 may project. The latch element 160 carries a spring 166 thereon that bears against the inner side of the U-shaped bracket 161 and a collar 167 backed by a pin 168. The spring 166 normally biases the latch element 160 through one of the holes 157 in the bracket 155. When in such engagement, the remote end of the auger assembly is locked or latched against angular movement.

The latch element 160 has an eyelet 170 receiving one end of a cable 171. The cable 171 is clamped in the eyelet by means of a pair of washers bearing against the eyelet and cable 171 and tightened by means of a bolt 174. The cable or control means 171 is passed through suitable openings, not shown, in the flanges 27, 28. The opposite end of the cable has a bight 180 over a pin 181 carried on a lever or control arm 182. The arm 182 is welded to the end of a pivot pin, shown only partially at 183 extending through a rolled hub extension 184 of a bracket attachment 185, the latter being bolted at 186 to the channel 56. Slots 187 are provided in the bracket portion 185 for adjusting the effective length of the cable 171. If the control arm 182 is permitted to drop, the biasing force of the spring 166 will force the latch element 160 into its latching position with one of the holes 157 in the bracket 155. If it is desired to retain the latch element 160 in an unlatched position, the arm 182 may be swung into a position of engagement with the surface of the housing 41 and the pin 181 will swing above the axis of the pivot pin 183. The spring 166 will then retain an over-center lock of the control element 182 and will retain the control arm 182 in a position in which the latch element 160 is unlatched or out of engagement with the holes 157.

The adjusting mechanisms at opposite ends of the conveyor 17 may be used for creating various positions of the slots at the material intake end of the conveyor and the remote end of the conveyor. Probably the most fundamental relation would be created when it is desired to open the slots directly downwardly. Such a situation might be desirable in raising the lower edge of the slots in the sections 18 to a relatively high level by adjusting both the remote end and the intake end of the conveyor. The remote end may be adjusted by unlatching the latch element 160. The lever 61 may then be used to roll the auger housing to the desired location. Since the remote end is unlatched, that end will be rotated to that location. When upon its reaching the desired location, the latch element 160 may then be inserted in its latched position and the unit will be held in that location. Often times it is desirable to move the slot to the underside of the auger when the unit is not being used to prevent precipitation from entering into the housing. It is also desirable in some instances to maintain the auger housing in a non-discharge position throughout its length and then to move the slot to the underside so that the material will be dumped out the entire length of the slot at the same time.

However, the primary advantage of having adjustments at opposite ends and particularly in having the control elements for creating the adjustments at only one end lies in the fact that it is desirable to have the lower edges of the slots inclined from a relatively high level at one end to a relatively low level at the remote end. This permits the material to be gradually discharged over the lower edge of the slot as it is augered from one end to the opposite end of the auger assembly. However, it should be recognized that different materials will require a different inclination of the lower edges 20 and it is therefore desirable to be able to adjust these edges depending upon the type of material being discharged. Such adjustment may be made by again unlatching both the intake end and the remote end of the auger and to rotate the remote end so that the slot will open at the desired location. The remote end may then be latched and locked in the desired location.

The intake end may then be swung by the control lever 61 so that the slot at that end will be at the desired height. The rigid uniform structure of the housing 18 will insure that the inclination of the edge 20 between the remote and the intake ends will be uniform. Should for some reason the lever 61 be moved to such an extent that it would tend, unless relieved, to permanently warp the auger housing 18, the latch element 160 will operate as an overload release device or shear pin which will fail or break prior to such an extreme load being applied by the lever device 61.

Provided with the conveyor 17 is a windbreak assembly consisting of an upper board or panel 190, having upper and lower horizontal edges, lying opposite the slot of the auger housings 18 and fixed to upright brackets 193 bolted at 192 to the end 130 of the conveyor support assembly 120. A laterally disposed panel 194, extending inwardly from the upper edge of panel 190, has an inner edge adjacent the tubes 18 and prevents air from chimneying between panel 190 and adjacent tubes 18.

The windbreak further includes a lower horizontally disposed board 195 having a lower edge adjacent the surface of the floor 13 and projecting upwardly therefrom. Supporting brackets 197 for the lower boards are provided on the support assemblies 120 and consist of a channel having a lower horizontal flange positioned beneath the flanges 123 and supporting an upright plate portion 198 at the end of the channel 122. The plate 198 is provided with holes 196 for receiving bolts mounting the lower board 195 thereto. The board 195 has an upper edge spacedly below the lower edge of the upper panel or board 190.

The upright wall portions 128 of the basic support device 120 are provided with vertically spaced openings 200 on which depending brackets 201 may be bolted as at 202. The lower ends of the brackets 201 carry pivot rods 203 extending to opposite sides thereof. Carried on the rods 203 are hollow pipes 204 that define a longitudinally extending horizontal pivot located between the lower edge of the panel 190 and the upper edge of the panel 195. Fixed to the pipes 204 by welding or other suitable means are transverse brackets 205 on which may be mounted an intermediate board 206. The upper edge of the board 206 is of the same level or slightly above the lower edge of the upper panel 190 and the lower edge is slightly below the upper edge of the panel 195. The individual pipes 204 have radially extending brackets 207 that flair from the ends for interconnection with similar brackets, by bolts 208, at the ends of the adjacent pipes 204.

The pipe 204 adjacent the end panel 50 has its radial bracket 207 connected to an end of a second bracket 210 horizontally pivoted at 211 on the wall 50. The pivot 211 is in the form of a pin extending through the wall and having a depending arm 212 internally of the wall 50 connected to the lower end of a sliding rod 213 having downwardly opening slots 214 therein. The pivot pipes 204 may therefore be pivoted about their axes and the board 206 may also be pivoted about their axes by retracting or extending the rod 213 in or out of the leg 109 and locking the rod by means of slots 214 engaging an edge of the leg.

The middle or intermediate board 206 may be used in conjunction with the upper and lower boards. Should the wind be directed across the conveyor 17 the material passing out of the side slot of the conveyor housing and passing between the vertical board 190 will pass onto the inclined board 206. The board 206 may be inclined so that the direction of the wind is against the bracket side of the board. The inclination of the board 206 will also drive or deflect the material to the leeward side of the lower board 195. Therefore, the wind will not cross or tend to blow the lighter materials from the feeding material outside of the bunk or trough 10 and consequently the full amount of material discharged will pass directly onto the floor 13 and be retained thereon by the lower board 195.

The conveyors will normally have an overall length of 50 to 150 feet and consequently an operator operating the control mechanism adjacent the hopper would have some difficulty in recognizing the adjustment at the far or remote end of the conveyor. To provide visual inspection so as to recognize the location of the slot at the remote end of the conveyor, there is provided an indicating device at the remote end. The indicating device is composed in part of an upright fan-shaped faced member or panel 215 having an indicia bearing surface facing the control end of the conveyor. As may be seen from viewing FIG. 14, there are seventeen marks, such as at 216, each mark 216 representing a hole 157 through which the locking element 160 may penetrate. The panel 215 has rearwardly projecting horizontal flange 217 lying atop the cross portion 141 of the previously described U-shaped support 139. The flange 217 is bolted, as at 218 to the strap or member 141. An L-shaped indicator rod 220 having a pointer 221 at one end has a lower horizontal leg portion 222 threaded, as at 223, extending through the vertical flange portion 27 of the ring 25 at the remote end of the conveyor. The vertical leg of the member 220 sweeps, depending upon the angular position of the auger housing, across the face of the indicator panel 215 and indicates by the pointer 221 the location of the opening 157 that the latching element 160 is recessed. The leg 222 of the L-shaped member 220 is provided with a pair of nuts on opposite sides of the flange 27 that fixes the indicator member 220 against movement relative to the flange 27.

In operation, when it is desired to reset the angle of inclination of the lower edge 20 of the slot, the latch element 160 is drawn forwardly or toward the control end of the conveyor until the end thereof is clear of the respective holes 157. When in its clear position, the operator may move the entire tube assembly angularly about its axis. The indicator rod 220 will indicate the location of the latch member 160 in respect to the openings 157. When the indicator rod 220 indicates the location desired, the latch 160 is permitted to move into the respective opening 157 and consequently that end of the conveyor tubing is fixed against angular motion. As previously explained, the lever at the control end of the conveyor may then be moved to the desired location that would provide for the desired angle of inclination of the lower slot edge 20. Consequently the entire adjustment may be made without first moving material and visually inspecting the discharge of material over the edge. In most cases, however, the operator will visually inspect the discharge of material and should it be unfavorable, the latch element 160 may be released and the tube at the remote end moved to the desired location.

While only one form of the invention has been shown, it should be recognized that other forms and variations will occur to those skilled in the art. Therefore while the preferred form was shown for the purpose of concisely illustrating the principles of the invention, it was not the intention to limit or narrow the invention beyond the broad concepts set forth in the appended claims.

What is claimed is:

1. A material feeding device comprising: a material container; an elongated substantially horizontal auger housing having an inner end adjacent the container and extending therefrom to an outer end, the housing further having side opening means therein; an auger in the housing; longitudinally spaced means supporting the housing for rotation thereof about its axis; adjusting means at the inner end of the housing for angularly and selectively positioning the housing about its axis to effect the angular location of the side opening means; a latching device at the outer end of the housing for locking the latter end at any of a plurality of angular positions; a control element extending alongside the housing between the inner end closely adjacent the adjusting means and connected to the locking device whereby an operator may selectively lock the outer end at a selected angular position about the axis and may selectively adjust the inner end at the same or different angular positions to thereby vary the location of the side opening means at both ends; a faced member adjacent to and extending radially from the outer end and having an indicia bearing surface facing the inner end; and an indicator element operatively associated with the auger housing at the outer end and movable relative to the indicia bearing surface to thereby indicate the angular position of the outer end.

2. A material feeding device comprising: a material container; an elongated substantially horizontal auger housing having an inner end adjacent the container and extending therefrom to an outer end, the housing further having side opening means therein; an auger in the housing; longitudinally spaced means supporting the housing for rotation thereof about its axis; adjusting means at the inner end of the housing for angularly and selectively positioning the housing about its axis to effect the angular location of the side opening means; a latching device at the outer end of the housing for locking the latter end at any of a plurality of angular positions; and a control element extending alongside the housing between the inner end closely adjacent the adjusting means and connected to the locking device whereby an operator may selectively lock the outer end at a selected angular position about the axis and may selectively adjust the inner end at the same or different angular positions to thereby vary the location of the side opening means at both ends.

3. A material feeding device comprising: a material container; an elongated substantially horizontal auger housing having an inner end adjacent the container and extending therefrom to an outer end, the housing further having side opening means therein; an auger in the housing; longitudinally spaced means supporting the housing for rotation thereof about its axis; adjusting means at the inner end of the housing for angularly and selectively positioning the housing about its axis to effect the angular location of the side opening means; a latching device at the outer end of the housing for locking the latter end at any of a plurality of angular positions whereby an operator may selectively lock the outer end at a selected angular position about the axis and may selectively adjust the inner end at the same or different angular positions to thereby vary the location of the side opening means at both ends; and a latch control device connected to the latch device and extending between the latching device and inner end, said control device including a control member at the inner end for effecting movement of the latching device to and from locking position.

4. A material feeding device comprising: a material container; an elongated substantially horizontal auger housing having an inner end adjacent the container and extending therefrom to an outer end, the housing further having side opening means therein; an auger in the housing; longitudinally spaced means supporting the housing for rotation thereof about its axis; and torsional adjusting and locking means at the inner and outer ends of the housing for angularly and selectively positioning the housing about its axis to effect the angular location of the side opening means at the respective inner and outer means whereby an operator may selectively adjust one end at a selected angular position about the axis and may selectively adjust the other end at the same or different angular positions to thereby vary the location of the side opening means at both ends, said adjusting and locking means having an overload release portion therein for releasing the respective end of the housing upon a torsional overload being applied to the housing at one end.

5. A material feeding device comprising: a material container; an elongated substantially horizontal auger housing having an inner end adjacent the container and extending therefrom to an outer end, the housing further having side opening means in the form of a material discharging slot at one side and extending the length thereof; an auger in the housing; vertical supporting means for suspending the housing and permitting rotation thereof about its axis; adjusting means at the inner end of the housing for angularly and selectively positioning the housing about its axis to affect the angular location of that end of the side discharge slot; a latching device between the supporting means and the outer end of the housing for locking the latter end at any of a plurality of angular positions; a control element supported outboard of the housing and extending from one end closely adjacent the adjusting means to the other end connected to the latching device to release the lock whereby an operator may selectively lock the outer end at a selected angular position about the axis and may selectively adjust the inner end at the same or different angular position to thereby vary the inclination of the slot; a faced member having an indicia bearing surface and an indicator member operatively associated with the auger housing at the outer end and movable relative to the indicia bearing surface to thereby indicate the angular position of the outer end.

6. A material feeding device comprising: a material container; an elongated substantially horizontal auger housing having an inner end adjacent the container and extending therefrom to an outer end, the housing further having side opening means in the form of a material discharging slot at one side and extending the length thereof; an auger in the housing; vertical supporting means for suspending the housing and permitting rotation thereof about its axis; adjusting means at the inner end of the housing for angularly and selectively positioning the housing about its axis to affect the angular location of that end of the side discharge slot; a latching device between the supporting means and the outer end of the housing for locking the latter end at any of a plurality of angular positions; a control element supported outboard of the housing and extending from one end closely adjacent the adjusting means to the other end connected to the latching device to release the lock whereby an operator may selectively lock the outer end at a selected angular position about the axis and may selectively adjust the inner end at the same or different angular position to thereby vary the inclination of the slot; a faced member having an indicia bearing surface and an indicator member supported for relative movement on the support means and housing, one member being operatively associated with the auger housing at the outer end and movable relative to the other member to thereby indicate the angular position of the outer end.

7. A material feeding device comprising: a material container; an elongated substantially horizontal auger housing having an inner end adjacent the container and extending therefrom to an outer end, the housing further having side opening means in the form of a material discharging slot at one side and extending the length thereof; an auger in the housing; vertical supporting means for suspending the housing and permitting rotation thereof about its axis; adjusting means at one end of the housing for angularly and selectively positioning the housing about its axis to affect the angular location of that end of the side discharge slot; a latching device between the supporting means and the other end of the housing for locking the latter end at any of a plurality of angular positions; a control element supported outboard of the housing and extending from one end closely adjacent the adjusting means to the other end connected to the latching device to release the lock whereby an operator may selectively lock the respective end at a selected angular position about the axis and may selectively adjust the other end at the same or different angular position to thereby vary the inclination of the slot; a faced member having an indicia bearing surface and an indicator member supported for relative movement on the support means and housing, one member being operatively associated with the auger housing at one end and movable relative to the other member to thereby indicate the angular position of the latter end.

8. A material feeding device comprising: an elongated substantially horizontal auger housing having an intake end and extending therefrom to a remote end, the housing further having an elongated slot at one side and extending the length thereof; an auger in the housing; longitudinally spaced supports suspending the housing for angular movement about its axis including supports at its intake and remote ends; adjusting means between the support and housing at the intake end for angularly and selectively positioning the housing about its axis; a releasable latching device at the remote end of the housing between the housing and support for locking the remote end of the housing at any of a plurality of positions; a control element supported adjacent the intake end; and means extending from the control element and latching device whereby an operator may selectively lock the outer end at a selected angular position about the axis and may selectively adjust the inner end at the same or different angular position to thereby vary the location of the side opening means at both ends.

9. An elongated auger housing structure for use in a conveyor having material moved longitudinally within the housing structure by an auger contained therein, comprising: a series of similar housing sections positioned end to end and C-shaped in cross section with a slot in the side extending the full length thereof; longitudinal structural elements in the form of a pair of U-shaped channels extending substantially the length of the section above and below the slot respectively with opposite leg portions fixed to the outer surface of the housing section and an interconnecting bight portion spaced outwardly from the surface; C-shaped radially extending flanges adjacent each end of the sections rigidly fixed to the respective housing sections with open sides thereof circumferentially in registry with the slotted sides of the housing sections, the flanges having sides thereof fixed to the end portions of the channels; annular cylindrical rings concentric with the housing sections fixed to the flanges outwardly of the channels and spaced from the surface of the housing sections; and means fixing the radial flanges of adjacent ends together whereby the housing structure will become uniformly rigid and the slots will be aligned with one another.

10. An elongated auger housing structure for use in a conveyor having material moved longitudinally within the housing structure by an auger contained therein, comprising: a series of similar housing sections positioned end-to end and C-shaped in cross section with a slot in the side extending the full length thereof; longitudinal structural elements extending substantially the lengths of the sections adjacent the slots and fixed to the outer surfaces of the housing sections; C-shaped radially extending flanges adjacent each end of the sections and rigidly fixed to the sections with open sides thereof circumferentially in registry with the slotted sides of the housing sections, the flanges having sides thereof fixed to the end portions of the strutural elements; annular cylindrical rings concentric with the housing sections fixed to the flanges outwardly of the structural elements and spaced from the surface of the housing sections; and means fixing the radial flanges of adjacent ends together whereby the housing structure will become uniformly rigid and the slots will be aligned with one another.

11. An elongated auger housing structure for use in a conveyor having material moved longitudinally within the housing structure by an auger contained therein, comprising: a series of similar housing sections positioned end-to end and C-shaped in cross section with a slot in the side extending the full length thereof; longitudinal structural elements extending substantially the lengths of the sections adjacent the slots and fixed to the outer surfaces of the housing sections; C-shaped radially extending flanges adjacent each end of the sections and rigidly fixed to the sections with open sides thereof circumferentially in registry with the slotted sides of the housing sections, the flanges having sides thereof fixed to the end portions of the structural elements; rings circumscribing the housing sections fixed to the flanges outwardly of the structural elements and spaced from the surface of the housing sections; and means fixing the radial flanges of adjacent ends together whereby the housing structure will become uniformly rigid and the slots will be aligned with one another.

12. On a longitudinally extending material discharge conveyor including an elongated horizontally disposed auger and auger housing, the latter having side discharge opening means for discharging material lengthwise of the auger, and vertical support means disposed longitudinally of the housing, the improvement comprising: longitudinally extending deflector means including lower and upper vertically disposed panels carried on the support means with the upper panel being offset in opposite disposed relation to the side opening means of the housing and having a lower edge, and the lower panel being spacedly below the upper panel with an upper edge spacedly below the lower edge of the upper panel, structure carried on the support means defining a longitudinal horizontal pivot substantially parallel to the axis of the auger and between the upper and lower panels, a longitudinal intermediate panel supported on the pivot for permitting inclination of the latter panel to deflect material passing downwardly between the upper panel and auger housing to either side of the lower panel; and means for adjusting the latter panel for selectively inclining it.

13. On a longitudinally extending material discharge conveyor including an elongated horizontally disposed auger and auger housing, the latter having side discharge opening means for discharging material lengthwise of the auger, and vertical support means disposed longitudinally of the housing, the improvement comprising: longitudinally extending deflector means including lower and upper vertically disposed panels carried on the support means with the upper panel being offset in opposite disposed relation to the side opening means of the housing and having a lower edge, and the lower panel being spacedly below the upper panel with an upper edge spacedly below the lower edge of the upper panel, structure carried on the support means defining a longitudinal horizontal pivot substantially parallel to the axis of the auger and between the upper and lower panels, a longitudinal intermediate panel bridging the spacing between the aforesaid upper edge and lower edge supported on the pivot for permitting inclination of the latter panel to deflect material passing downwardly between the upper panel and auger housing to either side of the lower panel; and means for adjusting the latter panel for selectively inclining it.

14. On a longitudinally extending material discharge conveyor including an elongated horizontally disposed auger and auger housing, the latter having side discharge opening means for discharging material lengthwise of the auger, and vertical support means including a trough having a trough floor disposed longitudinally of the housing, the improvement comprising: longitudinally extending deflector means including a lower upright panel having a lower edge adjacent the floor and extending upwardly to an upper horizontal edge and an upper vertically disposed panel carried on the support means and being offset in opposite disposed relation to the side opening means of the housing and having a lower edge spacedly above the upper edge of the lower panel, structure carried on the support means defining a longitudinal horizontal pivot substantially parallel to the axis of the auger and between the upper and lower panels, a longitudinal intermediate panel bridging the spacing between the aforesaid upper edge and lower edge of the lower and upper panels respectively supported on the pivot for permitting inclination of the intermediate panel to deflect material passing downwardly between the upper panel and auger housing to either side of the lower panel; and means for adjusting the latter panel for selectively inclining it.

15. A material feeding device comprising: an elongated substantially horizontal auger housing with an intake end and side opening means therein; a rotatably driven auger within the housing having an auger portion projecting outwardly and beyond the intake end; a material hopper at the intake end having opposite end walls with one of the end walls having a material opening in registry with the intake end of the auger housing and for passing into the hopper the aforesaid auger portion, said hopper further having an arcuate shaped auger floor section struck on a radius extending substantially from the axis of the auger portion and opposite side walls on opposite sides of the auger portion divergingly extending substantially tangentially from the floor section; a stripper panel fixedly attached to the side wall adjacent the downwardly moving side of the auger portion with a portion thereof extending in an approximate radial plane of the auger, said stripper plate having a stripping edge terminating close to the auger portion; and upwardly projecting finger elements longitudinally spaced and fixed on the stripper plate.

16. A material feeding device comprising: an elongated substantially horizontal auger housing with an intake end and side opening means therein; a rotatably driven auger within the housing having an auger portion projecting outwardly and beyond the intake end; a material hopper at the intake end having opposite end walls with one of the end walls having a material opening in registry with the intake end of the auger housing and for passing into the hopper the aforesaid auger portion, said hopper further having an arcuate shaped auger floor section struck on a radius extending substantially from the axis of the auger portion and a first longitudinal side wall structure adjacent the upwardly moving side of the auger portion extending upwardly and outwardly in respect to the aforesaid radius from the floor section, said hopper further including a second longitudinal side wall structure adjacent the downwardly moving side of the auger portion with a portion thereof extending in an approximate radial plane of the auger and having a stripping edge terminating close to the auger portion.

17. The invention defined in claim 16 further characterized by longitudinally spaced elements projecting from the second wall structure in the path of material gravitating to the downwardly moving side of the auger portion.

18. A material feeding device comprising: an elongated substantially horizontal auger housing with an intake end and a continuous side opening slot therein extending from one end to the other end; a rotatably driven auger helicoid within the housing having an auger portion projecting outwardly and beyond the intake end; a material hopper at the intake end having an end wall with a material opening in registry with the intake end of the auger housing and for passing into the hopper the aforesaid auger portion; and material agitating elements detachably mounted on the helicoid and having portions thereon extending from the facings of the helicoid.

19. On a longitudinally extending material discharge conveyor including an elongated horizontally disposed auger and auger housing, the latter having side discharge opening means for discharging material lengthwise of the auger, and vertical support means disposed longitudinally of the housing, the improvement comprising: longitudinally extending deflector means including lower and upper vertically disposed panels carried on the support means with the upper panel being offset in opposite disposed relation to the side opening means of the housing and having a lower edge, and the lower panel being spacedly below the upper panel with an upper edge spacedly below the lower edge of the upper panel, structure carried on the support means defining a longitudinal horizontal pivot substantially parallel to the axis of the auger and between the upper and lower panels, a longitudinal intermediate panel bridging the spacing between the aforesaid upper edge and lower edge supported on the pivot for permitting inclination of the latter panel to deflect material passing downwardly between the upper panel and auger housing to either side of the lower panel; means for adjusting the latter panel for selectively inclining it; and a laterally disposed panel means extending inwardly from the upper panel to an edge closely adjacent the tube and above the side discharge opening means.

20. On a longitudinally extending material discharge conveyor including an elongated horizontally disposed auger and auger housing, the latter having side discharge opening means for discharging material lengthwise of the auger, and vertical support means disposed longitudinally of the housing, the improvement comprising: longitudinally extending deflector means including an upper panel structure carried on the support means with a vertically disposed panel section being spacedly offset from the side opening means of the housing and having a lower edge, and a laterally disposed panel section extending inwardly from the vertical panel section to an inner edge above the side discharge opening means and adjacent the housing, a lower panel spaced below the upper panel structure with an upper edge spacedly below the lower edge of the upper panel, a longitudinal intermediate panel bridging the spacing between the aforesaid upper edge and lower edge adjustably supported for permitting inclination of the latter panel to deflect material passing downwardly between the upper panel and auger housing to either side of the lower panel; and means for adjusting the latter panel for selectively inclining it.

21. On a longitudinally extending material discharge conveyor including an elongated horizontally disposed auger and auger housing, the latter having side discharge opening means for discharging material lengthwise of the auger, and vertical support means disposed longitudinally of the housing, the improvement comprising: longitudinally extending deflector means including an upper panel structure carried on the support means with a vertically disposed panel section being spacedly offset from the side opening means of the housing and having a lower edge below the side discharge means, and a laterally disposed panel section extending inwardly from the vertical panel sections to an inner edge above the side discharge opening means and adjacent the housing.

References Cited by the Examiner

UNITED STATES PATENTS

| | | | |
|---|---|---|---|
| 1,455,493 | 5/1923 | John | 56—25 |
| 2,066,756 | 1/1937 | Anderson | 198—64 |
| 2,606,645 | 8/1952 | Heine | 198—64 |
| 2,706,046 | 4/1955 | Andrews | 198—64 |
| 2,867,314 | 1/1959 | Hansen | 198—64 |
| 3,107,005 | 10/1963 | Cauffman | 198—64 |

FOREIGN PATENTS 1,306,236   9/1962   France.

EVON C. BLUNK, *Primary Examiner.*

ROBERT E. AEGERTER, *Examiner.*